United States Patent
Matani

(10) Patent No.: US 12,533,514 B2
(45) Date of Patent: Jan. 27, 2026

(54) PERCUTANEOUS EXTRACELLULAR IMPEDANCE CONTROL DEVICE

(71) Applicant: HIROSHIMA UNIVERSITY, Higashihiroshima (JP)

(72) Inventor: Ayumu Matani, Hiroshima (JP)

(73) Assignee: HIROSHIMA UNIVERSITY, Hiroshima (JP)

( * ) Notice: Subject to any disclaimer, the term of this patent is extended or adjusted under 35 U.S.C. 154(b) by 281 days.

(21) Appl. No.: 18/374,633

(22) Filed: Sep. 28, 2023

(65) Prior Publication Data

US 2024/0108895 A1    Apr. 4, 2024

(30) Foreign Application Priority Data

Sep. 29, 2022   (JP) .................................. 2022-155812

(51) Int. Cl.
   *A61N 1/36*        (2006.01)

(52) U.S. Cl.
   CPC ....... *A61N 1/36031* (2017.08); *A61N 1/3601* (2013.01)

(58) Field of Classification Search
   CPC ..... A61N 1/36031; A61N 1/3601; A61N 1/05
   See application file for complete search history.

(56) References Cited

FOREIGN PATENT DOCUMENTS

| CN | 108175408 A | * | 6/2018 | ........... A61B 5/0537 |
|----|-------------|---|--------|------------------------|
| JP | 6146706 B2  |   | 6/2017 |                        |
| JP | 2023136293 A| * | 9/2023 |                        |

* cited by examiner

*Primary Examiner* — Jonathan T Kuo
(74) *Attorney, Agent, or Firm* — Maschoff Brennan

(57) ABSTRACT

A device for controlling percutaneously extracellular impedance according to an aspect of the present disclosure includes a terminal pair to which an electrode pair is to be connected, the electrode pair being attached to a subject's body surface to capture a subject's bioelectrical potential, wherein the device adds negative impedance of which resistance and reactance components are adjustable to the electrode pair via the terminal pair.

7 Claims, 4 Drawing Sheets

PERCUTANEOUS EXTRACELLULAR IMPEDANCE CONTROL DEVICE

CROSS-REFERENCE TO RELATED APPLICATIONS

This application claims priority to Japanese Patent Application No. 2022-155812 filed on Sep. 29, 2022, the entire disclosure of which is hereby incorporated by reference.

BACKGROUND OF THE INVENTION

This disclosure relates to the technology for controlling the body activity currents in the human body from the outside by attaching an electrical device to the surface of the human body.

It is known that weak electric currents flow through various tissues in the living human body. For example, whether neurons, which are responsible for brain functions by their excitation and inhibition, are excited or not is determined by the membrane potential which is the voltage inside and outside the neuron, and the membrane potential is determined by the current that supplies synapses. In more detail, cellular membranes near synapses behave like a battery that appears and disappears depending on whether signals are passed between neurons. The current that flows from the synaptic battery into the neurons passes through cellular membranes at another locations, exits the neuron to circulate around the head, and then returns to the battery. Viewing such a brain's neural circuit as an electrical circuit, intraneuronal electrical resistance, electrical resistance of the cellular membranes, and extraneuronal electrical resistance (both near the scalp and elsewhere) are connected in series to the synaptic battery. If a large amount of current flows in the electrical circuit, the voltage generated inside and outside the cellular membrane near the nucleus of the neurons will also increase according to Ohm's law. When the voltage exceeds a certain threshold, the neuron enters a state called firing, i.e., it becomes excited and transmits signals to the next neuron.

It is anticipated that by reducing the extracellular electrical resistance and increasing the current, it would be possible to enhance the excitation of neurons. With this concept in mind, the inventor of the present application has developed a transcranial extracellular impedance control (tEIC) and disclosed it in the specification of the Japanese Patent No. 6146706. Through behavioral experiments, the use of tEIC has been shown to have a stimulating effect on brain function.

While tEIC is designed for use on the head, it's possible to attach an electrode pair of tEIC to other parts of the body's surface. For example, attaching the electrode pair to the arm or leg and utilizing tEIC could modulate the current flowing through cells in that area by altering extracellular electrical resistance through the action of negative electrical resistance. However, the results of such usage on the human body and, more specifically, how it might influence brain activity, remain unclear. In other words, the effectiveness of using tEIC on areas other than the head is unknown.

Furthermore, dirt or keratin on the scalp remaining at the point where the electrode pair is attached may increase the contact impedance and prevent tEIC from functioning adequately. Therefore, when using tEIC, it's necessary to thoroughly clean the subject's scalp to remove dirt or keratin to ensure proper function. However, this places a significant burden on both the subjects and the operators. Furthermore, when applying tEIC to areas other than the head, there might be cases where it's not feasible to adequately clean the body's surface from dirt or keratin. Hence, there is a demand for an extracellular impedance control device that can effectively operate even when there is dirt or keratin residue on the area where the electrode pair is attached, essentially being less susceptible to the effects of contact impedance.

SUMMARY OF THE INVENTION

A device for controlling percutaneously extracellular impedance according to an aspect of the present disclosure includes a terminal pair to which an electrode pair is to be connected, the electrode pair being attached to a subject's body surface to capture a subject's bioelectrical potential, wherein the device adds negative impedance of which resistance and reactance components are adjustable to the electrode pair via the terminal pair.

DETAILED DESCRIPTION OF THE INVENTION

Embodiments of the present disclosure will now be described in detail with reference to the drawings as needed. Note that excessively detailed description will sometimes be omitted to herein to avoid complexity. For example, detailed description of a matter already well known in the art and redundant description of substantially the same configuration will sometimes be omitted herein. This will be done to avoid redundancies in the following description and facilitate the understanding of those skilled in the art. Note that the present inventors provide the following detailed description and the accompanying drawings only to help those skill in the art fully appreciate the present disclosure and do not intend to limit the scope of the subject matter of the appended claims by that description or those drawings.

Figure 1:
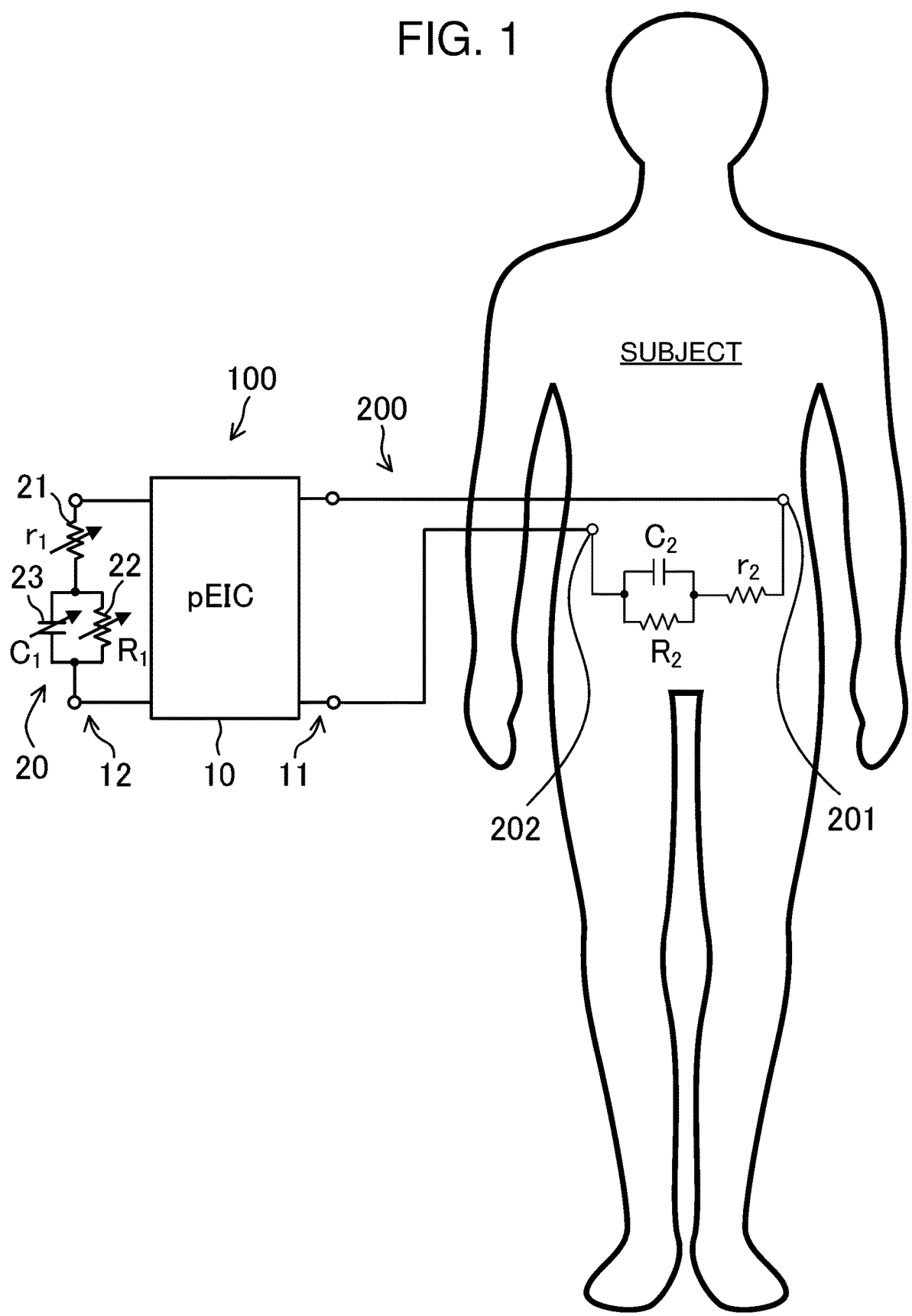
FIG. 1 illustrates an electrical circuit diagram of a percutaneous extracellular impedance control (pEIC) device according to an embodiment of the present disclosure.

FIG. 1 illustrates an electrical circuit diagram of a pEIC device according to an embodiment of the present disclosure. The pEIC device 100 is used in connection with an electrode pair 200 that is attached to the subject's body surface to capture the subject's bioelectric potential, e.g., at least an electric activity of the diaphragm (EAdi).

The electrode pair 200 has a first electrode 201 and a second electrode 202. Both electrodes 201 and 202 are passive electrodes and have a subject's body impedance of 10 kΩ or less, for example. The electrode pair 200 may be affixed directly to the subject's body surface, or it may be placed on a belt-like object and brought into contact with the subject's body surface by wrapping the belt around the subject. For example, when capturing EAdi, electrodes 201 and 202 can be placed at locations on the body surface where EAdi can be captured well, such as two locations on either side of the front of the abdomen across the midline, two locations above and below the xiphoid process, and two locations on the abdomen and back.

The pEIC device 100 is substantially a two-port circuit with a load connected to one port thereof. Specifically, the pEIC device 100 has a two-port circuit 10 and a load circuit 20 connected to one port of the two-port circuit 10. The pEIC device 100 can be driven by two AA batteries.

The two-port circuit 10 has two ports, i.e., a first terminal pair 11 and a second terminal pair 12. The first terminal pair 11 may be referred as "Port I," and the second terminal pair 12 may be referred as "Port II," hereinafter. For example, the electrode pair 200 can be connected to the first terminal pair 11 of the two-port circuit 10, and the load circuit 20 is connected to the second terminal pair 12. The assignment of Port I and Port II of the two-port circuit 10 to the terminal pairs 11 and 12 depends on the type of the pEIC device 100 used. As described below, there are two types of the pEIC device 100 use types, Type I and Type II. For convenience, as an example, Type I is defined as when the subject is connected to Port I and the load circuit 20 is connected to Port II, and Type II is defined as when the subject is connected to Port II and the load circuit 20 is connected to Port I.

Figure 2:
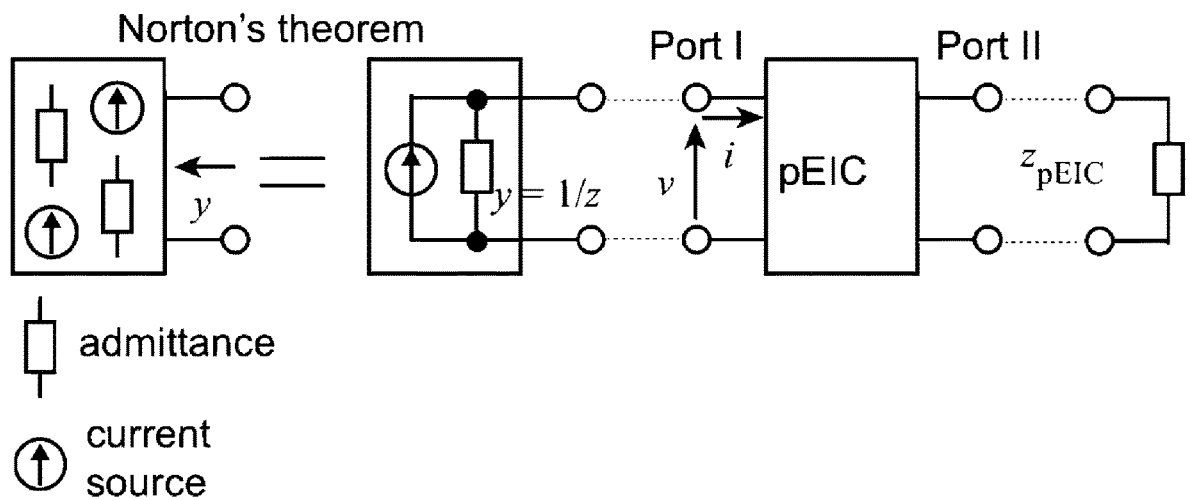
FIG. 2 illustrates a schematic diagram of an electrical circuit model for the measurement of biological potential via an electrode pair.

FIG. 2 illustrates a schematic diagram of an electrical circuit model for the measurement of biological potential via an electrode pair. The human body can be thought of as a collection of many active current sources and static admittances, such as the circuit shown on the left part of the figure. From Norton's theorem, it can be modeled as an equivalent circuit with one current source and one admittance in parallel connected to a pair of electrodes, as shown in the center part of the figure. The current generated by the current source in the equivalent circuit corresponds to the current flowing between the electrodes when the electrode pair is shorted in the original circuit before modeling. The admittance y in the equivalent circuit is the admittance seen from the electrode pair when all current sources are cut off in the original circuit. Thus, the current and voltage at electrode pair 200 can be easily calculated when the pEIC device 100 is connected to the human body via electrode pair 200.

In the two-port circuit 10, the terminal pair 11 exhibits a negative impedance characteristic that inverts the positive impedance of the load circuit 20 connected to terminal pair 12. This allows the pEIC device 100 to add a negative impedance to the electrode pair 200 connected to the terminal pair 11.

Figure 3A:
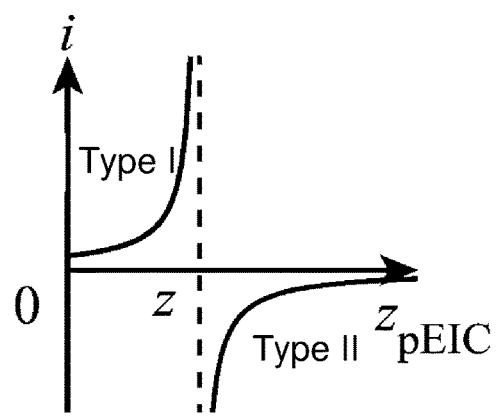
FIGS. 3A and 3B illustrate graphs showing the characteristics of the current variation and the voltage variation of an electrode pair with respect to impedance of a load circuit.
Figure 3B:
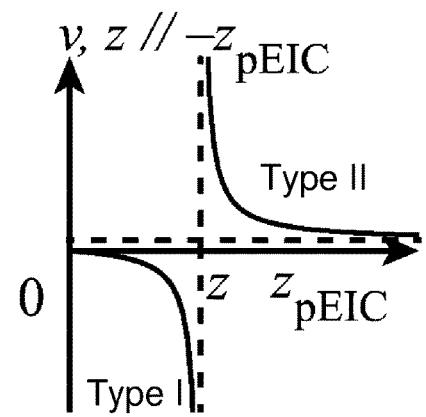

FIG. 3A illustrates a graph showing the characteristics of the current variation of the electrode pair 200 with respect to impedance $z_{pEIC}$ of the load circuit 20. FIG. 3B illustrates a graph showing the characteristics of the voltage variation thereof. For convenience, it is assumed that both the impedance z (=1/y) in the equivalent circuit shown in FIG. 2 and the impedance $z_{pEIC}$ of the load circuit 20 are resistive components without imaginary parts. Referring to the $z_{pEIC}$-i characteristic graph in FIG. 3A, it can be seen that the current i of the electrode pair 200 is positively amplified when the pEIC device 100 is used in Type I and negatively amplified when it is used in Type II. It is important to note that the pEIC device 100 is essentially a negative impedance and not a current source, so it is not applying a current stimulus to the human body from the outside, but merely changing the distribution of volume current. In Type I, a portion of the biological activity current flowing through the human body is extracted externally and amplified positively and returned to the human body, while in Type II it is amplified negatively and returned to the human body. A subject does not perceive the current.

Referring to the $z_{pEIC}$-v characteristic graph in FIG. 3B, it can be seen that the voltage v of the electrode pair 200 is negatively amplified when the pEIC device 100 is used in Type I and positively amplified when used in Type II, contrary to the current i characteristic. The shape of the $z_{pEIC}$-v characteristic is the same as the composite impedance of the parallel connection $z//-z_{pEIC}$ of z and $(-z_{pEIC})$ according to Ohm's law. The characteristics of the current i and voltage v of the electrode pair 200 may cause concern that the current i and voltage v may diverge to infinity, but since the pEIC device 100 is driven by two AA batteries, the current i and voltage v of the electrode pair 200 will saturate at safe values and will not diverge.

Referring to FIG. 1, the load circuit 20 is a two-port circuit. Specifically, the load circuit 20 has a variable resistor 21, a variable resistor 22 connected in series with the variable resistor 21, and variable capacitor 23 connected in parallel with variable resistor 22. Here, the resistance value of variable resistor 21 is $r_1$, the resistance value of variable resistor 22 is $R_1$, and the capacitance value of variable capacitor 23 is $C_1$. A first terminal of the variable resistor 21 and first terminals of the variable resistor 22 and the variable capacitor 23 are connected to each other and they are connected to a first terminal of the terminal pair 12 of the two-port circuit 10. A second terminals of the variable resistor 22 and the variable capacitor 23 are connected to each other and they are connected to a second terminal of the terminal pair 12. Thus, the electrical characteristics of the component passive elements are adjustable in the load circuit 20, and as a whole resistance and reactance components of the impedance of the load circuit 20 are adjustable.

In explaining the $z_{pEIC}$-i and $z_{pEIC}$-v characteristics above, it is assumed that the impedance z (=1/y) in the equivalent circuit shown in FIG. 2 is a resistance component with no imaginary part. To make this assumption, it is necessary to sufficiently wipe off the dirt or keratin on the human body surface that the electrodes 201 and 202 of the electrode pair 200 come into contact with. This is because if dirt or keratin remains on the human body surface, it becomes a capacitive component and the imaginary part (i.e., reactance component) of impedance z becomes non-negligible.

The human body can be thought of as an electrical circuit having multiple resistance components R and capacitance components C connected together. When the circuit is Foster expanded, as shown in FIG. 1, the human body can be approximated as an RC circuit which has a first resistance element and a capacitance element connected in parallel with each other and a second resistance element connected in series with the first resistance element and the capacitance element. Here, the resistance value of the first resistance element is $R_2$, the capacitance value of the capacitance element is $C_2$, and the resistance value of the second resistance element is $r_2$. The load circuit 20 mimics the RC circuit of the human body.

By adjusting the capacitance value $C_1$ of the variable capacitor 23 in particular in the load circuit 20 as appropriate, the residual capacitance component caused by dirt or keratin on the human body surface in the contact areas of the electrodes 201 and 202 is canceled, and the voltage v and current i of the electrode pair 200 can be controlled in a state close to the ideal characteristics shown in FIGS. 3A and 3B. In other words, the pEIC device 100 can accurately control the voltage v and current i of electrode pair 200 even if some dirt or keratin remains on the human body surface.

More precisely, the pEIC device 100 operates stably when the conditions of $\text{Re}\{z\} > \text{Re}\{z_{pEIC}\}$ and $\text{Im}\{z\} < \text{Im}\{z_{pEIC}\}$ for Type I and, conversely, $\text{Re}\{z\} < \text{Re}\{z_{pEIC}\}$ and $\text{Im}\{z\} > \text{Im}\{z_{pEIC}\}$ for Type II, respectively, where Re is the real part of the complex impedance (i.e., resistance component) and Im is the imaginary part (i.e., reactance component). If these conditions are not met, the voltage v of the electrode pair 200 to which the pEIC device 100 is connected will diverge or oscillate. The capacitance value $C_1$ of the variable capacitor 23 mainly determines the imaginary part of the impedance $z_{pEIC}$ of the load circuit 20. In Type II, the variable capacitor 23 is not so important element because $C_1$ can be small given the above condition $\text{Im}\{z\} > \text{Im}\{z_{pEIC}\}$, and it can be omitted in some cases. On the other hand, in Type I, the condition $\text{Im}\{z\} <!\text{rhizoid}$ requires a larger value of $C_1$, so the variable capacitor 23 can be a very important element, and the adjustment of its capacitance value greatly affects the voltage accuracy of the electrode pair 200.

Use Case

Through behavioral experiment, the inventor obtained significant results showing that the pEIC device 100 can control the subject's arousal when the pEIC device 100 intervenes in diaphragmatic exercises. The following is an example of the use of the pEIC device 100 as well as the background and outline of the experiment.

Background of Experiment

Human emotions or feelings are thought to be evaluated on two axes: arousal (i.e., degree of stimulation) and emotional valence (i.e., pleasantness or unpleasantness). An arousal is immediately recalled when a person sees an image with a high arousal valence. Although there may be individual differences, this can be easily expected by imagining that a person sees an image of blood-covered people or bright fireworks. It has been hypothesized that the generation of human emotions or feelings involves an interception, which are primarily bodily sensations controlled by the autonomic nervous system, such as internal organs, and studies on this subject have been active in recent years. For example, it is known empirically and by scientific behavioral experiments that tension or anxiety is correlated with increased respiration or heart rate within a unit of time. Respiration or heart rate can be measured electrically by means of an electric activity of diaphragm (EAdi). Although these electrical activities are often thought to be caused by muscle movement, for example, the EAdi is sometimes used as an input to a ventilator and includes control signals to the muscles, rather than merely monitoring muscle activity. Therefore, the inventor thought that connecting the pEIC device 100 to an electrode capable of capturing EAdi would allow intervention in respiratory control and, eventually, emotional or affective control.

Summary of Experiment

A total of thirty-one participants, fifteen males and sixteen females, cooperated in the experiment. The mean age of the participants is 22.1 years, with a standard deviation of 2.1. Participants are fitted with electrodes to measure electroencephalography (EEG), electrocardiogram (ECG), electrodiaphragm-gram (EDG), and respiration during the experimental trial. Seven monopolar electrodes (EDG2 to EDG8) and one bipolar electrode (EDG1) for measuring EDG are embedded in a belt, which is wrapped around the participant's abdomen so that a total of eight electrodes are in contact with the participant's abdomen. EDG1 and EDG2 are placed at two locations on either side of the anterior abdominal surface across the midline, and these electrodes are connected to the pEIC device 100 to intervene the pEIC device 100 on EDG1 and EDG2. In addition, an airbag-type respiration sensor is placed on the midline just below the xiphoid process of the participant, thirty-two electrodes are attached to the head for measuring EEG, and bipolar electrodes are attached to the chest for measuring ECG. All electrodes are passive electrodes, and their impedance is below 50 kΩ. In particular, the impedance of EDG1 and EDG2, to which the pEIC device 100 is connected, is less than 10 kΩ.

Procedure of Experiment

Three experiments are conducted: one with the pEIC device 100 in Type I, one with the pEIC device 100 in Type II, and one with placebo (hereafter referred to as "Sham"), where the electrode pair 200 are attached to the participant but the pEIC device 100 is inactive. Images used in the experiments are selected from International Affective Picture System (ZAPS). Each IAPS image is associated with individual arousal and emotional valence scores of general people. Three-hundred eighty-one (=127×3) affective images are selected from IAPS that meet the four conditions of arousal level {high or low}×emotional valence {high or low}. Participants are presented with one of the one-hundred twenty-seven images at random every three seconds in each experiment and are asked to respond to the emotional value of the image by intuitively choosing between "pleasant" and "unpleasant" as quickly as possible.

In Type I and Type II, the value adjustment of each element of the load circuit 20 of the pEIC device 100 is performed in consideration of the stable operating conditions of the pEIC device 100 in each type described above, for example, as follows: In Type I, the resistance values $r_1$ and $R_1$ of the variable resistors 21 and 22 are smaller than the resistance values $r_2$ and $R_2$ of the RC circuit of the human body (i.e., $r_1 < r_2$, $R_1 < R_2$), and the capacitance value $C_1$ of the variable capacitor 23 is larger than the capacitance value $C_2$ of the RC circuit of the human body (i.e., $C_1 > C_2$), so that the voltage between the electrodes EDG 1-2 is sufficiently low and stable. From that state, the resistance values of variable resistors 21 and 22 are increased and the capacitance value of variable capacitor 23 is decreased; in Type II, the opposite adjustment method is used. This is illustrated in the graph in FIGS. 3A and 3B, where the impedance $z_{pEIC}$ of the load circuit 20 is kept away from $z_{pEIC} = z$, which is the asymptote (i.e., the pole in system theory), and then gradually brought closer to z. However, if $z_{pEIC}$ is set too close to z, the voltage between the electrodes EDG 1-2 saturates, so it is preferable to adjust the voltage between the electrodes EDG 1-2 to a level that is roughly ten times the voltage when the pEIC device 100 is inactive.

Figure 4:
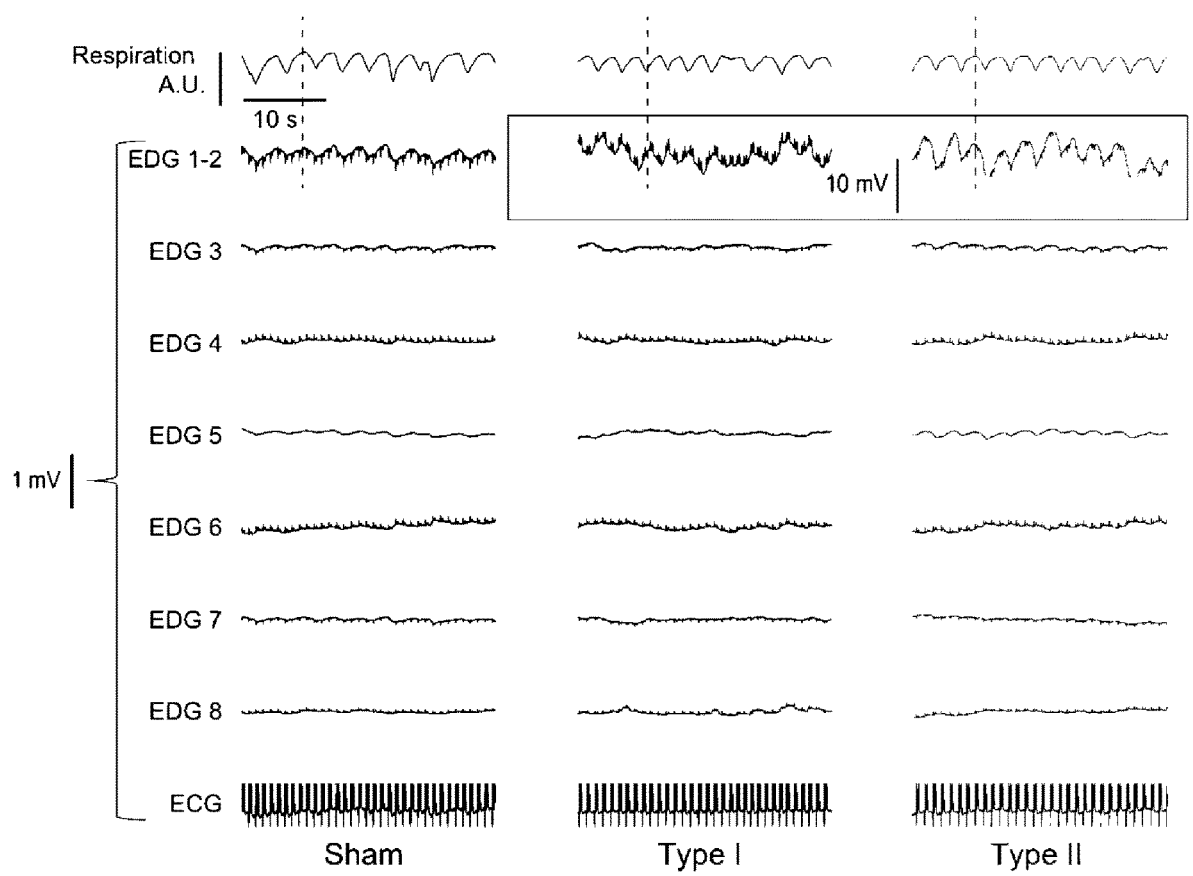
FIG. 4 illustrates example 30-second snapshot graphs of respiration, electrical activity of the diaphragm, and electrocardiogram.

FIG. 4 illustrates example 30-second snapshot graphs of respiration, EDG, and ECG. In Sham, the signal amplitudes of EDG1-2 and EDG3 to EDG8 are all less than 1 mV, while in Type I and Type II EDG1-2 is amplified to about 10 mV (see box in the figure). In addition, compared to the respiration, the cycle of EDG1-2 waveform coincides with that of the respiration waveform. This indicates that connecting the pEIC device 100 to the human body can particularly increase EDG. Furthermore, the ECG is superimposed on the waveform of the respiration cycle in EDG1-2 waveform as a downward spike in Sham, an upward spike in Type I, and a downward spike in Type II. This indicates that the voltage of between the electrodes of EDG1-2 is negatively amplified in Type I and positively amplified in Type II, which is consistent with the $z_{pEIC}$-v characteristics shown in FIG. 3B.

Results and Discussion

Figure 5:
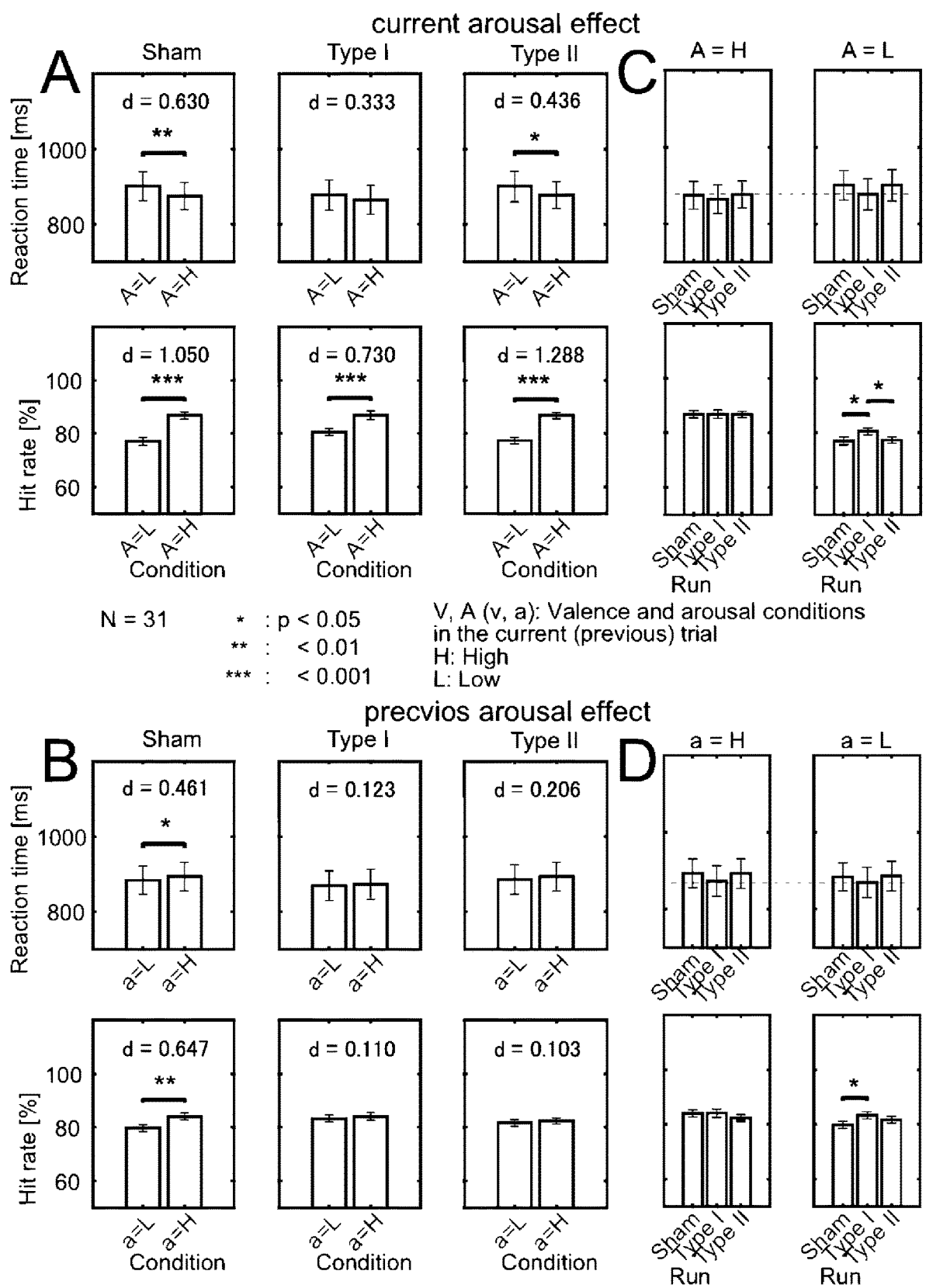
FIG. 5 illustrates a graph showing the experimental results.

FIG. 5 illustrates a graph showing the experimental results. Results A and C show the reaction time and the hit rate of responses to the high and low arousal of the currently presented image. A=L represents low arousal and A=H represents high arousal. Results B and D show the reaction time and the hit rate of responses to the high and low arousal of the image presented one time before. a=L represents low arousal of one time before and a=H represents high arousal of one time before.

Analysis of Result A: In Sham, although participants are asked to respond to the emotional valence, there is a significant difference in reaction time and hit rate depending on the arousal, such that reaction time is shorter and the hit rate is higher when the arousal of the presented images is high (i.e., A=H) than when it is low (i.e., A=L). Since reaction time is not so important here, when looking only at the hit rate (i.e., looking Cohen's d values), this trend decreased for Type I and increased for Type II.

Analysis of Result C: When the trends of Result A are examined separately for high and low arousal of the presented image, the hit rate improves when arousal is low (i.e., A=L) in Type I.

Analysis of Result B: In Sham, there is a significant difference in the reaction time and the hit rate to the emotional valence of the currently presented images in relation to the high and low arousal of the images presented one time before. On the other hand, in Type I and Type II, such trends completely disappear.

Analysis of Result D: When the trends of Result B are examined separately for high and low arousal of the image presented one time before, the hit rate improves when arousal is low (i.e., a=L) in Type I.

Discussion

It is hypothesized that human emotions or feelings are caused by the involvement of both the brain and the body, and this experiment has proved through behavioral experiments that the body was also causally involved. From this proof, an electrical device, i.e., the pEIC device 100 that increases or decreases the electric current generated by the body through bodily activity is intervened in EDG, and a behavioral experiment is conducted to evaluate emotional valence, and statistically significant results are obtained in reaction time and hit rate. Note that the increase in the hit rate only means that the general emotional valence evaluation and that of the individual tend to agree. Thus, a higher hit rate implies a "normal humanization" of the individual.

In general, stimuli with high arousal produce high and low emotional valence, but if arousal is low, the range of high and low emotional valence becomes smaller and more difficult to evaluate. Conversely, if the arousal can be controlled, it is possible to amplify or attenuate the range of emotional valence for a stimulus. In this regard, it is suggested that the pEIC device 100 amplifies or attenuates the arousal by controlling the distribution of body activity currents within the human body. In other words, it is possible to control the range of emotional valence indirectly by intervening the pEIC device 100 in EDG. For instance, the pEIC device 100 may have a therapeutic effect on symptoms and diseases that cause emotional reactions to minor events or, conversely, emotional indifference to everything. In such cases, the pEIC device 100 can electrically affect the exact opposite of positive and negative, so that the treatment can be reversed if it becomes ineffective. Electrical reversal does not necessarily produce a therapeutic reversal, but at least if the pEIC device 100 is inactive, the therapeutic effect can be reduced to zero at that point.

Signals input through the senses are not painful in themselves but are physical or chemical quantities that are essentially unrelated to emotions and feelings. If an input signal is interpreted as meaning to the person to whom it is input and its arousal is high, the signal will act as emotions or feelings to the person. Thus, by adjusting arousal, physical or chemical stimuli can act as higher-order emotional stimuli. Whether insensitive or sensitive to emotions or feelings, some mental defects may occur, and if the degree of defects increases, they may lead to psychiatric disorders. Previous studies and the present experiment suggest that arousal gain adjustment is made by interception. Adjusting the arousal gain using the pEIC device 100 can contribute to mental stability.

Variations and Applications

The pEIC device 100 is not limited to use in the abdomen (i.e., intervention in EAdi), but can be used in other areas. For example, when used on the head, the pEIC device 100 operates as an improved tEIC that is less affected by contact impedance. The electrode pair 200 is not limited to two electrodes. For example, multiple electrodes may be provided for the positive and negative electrodes, respectively.

As can be seen in the foregoing, embodiments have just been described as examples of the technique disclosed in the present disclosure. For this purpose, accompanying drawings and detailed description have been provided. The components illustrated on the accompanying drawings and described in the detailed description include not only essential components that need to be used to overcome the problem, but also other unessential components that do not have to be used to overcome the problem. Therefore, such unessential components should not be taken for essential ones, simply because such unessential components are illustrated in the drawings or mentioned in the detailed description. The above embodiments, which have been described as examples of the technique of the present disclosure, may be altered or substituted, to which other features may be added, or from which some features may be omitted, within the range of claims or equivalents to the claims.

The invention claimed is:

1. A device for controlling percutaneously extracellular impedance, comprising,
    a terminal pair to which an electrode pair is to be connected, the electrode pair being configured to be attached to a subject's body surface to capture a subject's bioelectrical potential, wherein
    the device adds negative impedance of which resistance and reactance components are adjustable to the electrode pair via the terminal pair.

2. The device of claim 1, further comprising,
    a load circuit of which impedance is adjustable, and
    a two-port circuit including a first terminal pair and a second terminal pair, the first terminal being connected to the electrode pair and the second terminal pair being connected to the load circuit, wherein
    the first terminal pair exhibits a negative impedance characteristic with positive and negative inverted impedance of the load circuit connected to the second terminal pair.

3. The device of claim 2, wherein
    the load circuit includes
        a first variable resistor,
        a second variable resistor connected in series with the first variable resistor, and
        a variable capacitor connected in parallel with the second variable resistor.

4. The device of claim 1, wherein the bioelectrical potential includes an electrical activity of the diaphragm.

5. The device of claim 2, wherein the bioelectrical potential includes an electrical activity of the diaphragm.

6. The device of claim 3, wherein the bioelectrical potential includes an electrical activity of the diaphragm.

7. A device for controlling percutaneously extracellular impedance, comprising,
   a terminal pair to which an electrode pair is to be connected, the electrode pair being configured to be attached to a subject's body surface to capture at least a subject's electrical activity of the diaphragm, wherein the device adds negative impedance to the electrode pair via the terminal pair.

* * * * *